(12) United States Patent  (10) Patent No.: US 8,017,003 B2
Furonaka et al.  (45) Date of Patent: Sep. 13, 2011

(54) PROCESSING WASTE LIQUID TREATING APPARATUS

(75) Inventors: Takeshi Furonaka, Ota-Ku (JP); Miki Yoshida, Ota-ku (JP)

(73) Assignee: Disco Corporation, Tokyo (JP)

( * ) Notice: Subject to any disclaimer, the term of this patent is extended or adjusted under 35 U.S.C. 154(b) by 362 days.

(21) Appl. No.: 12/364,247

(22) Filed: Feb. 2, 2009

(65) Prior Publication Data

US 2009/0206016 A1    Aug. 20, 2009

(30) Foreign Application Priority Data

Feb. 15, 2008  (JP) ................................. 2008-034084

(51) Int. Cl.
*C02F 9/02*    (2006.01)

(52) U.S. Cl. ........ 210/134; 210/149; 210/236; 210/260; 210/262

(58) Field of Classification Search .................. 210/259, 210/260, 262, 236, 149, 134
See application file for complete search history.

(56) References Cited

U.S. PATENT DOCUMENTS 4,784,763 A  * 11/1988 Hambleton et al. ............ 210/90
6,746,309 B2 *  6/2004 Tsuihiji et al. .................. 451/28

FOREIGN PATENT DOCUMENTS

JP    A 2004-230527    8/2004

* cited by examiner

*Primary Examiner* — Terry Cecil
(74) *Attorney, Agent, or Firm* — Greer, Burns & Crain, Ltd.

(57) ABSTRACT

In a processing waste liquid treating apparatus, a housing includes a bottom wall, an upper wall, a left lateral wall, a rear wall and an opening/closing door for opening/closing a front opening. A waste liquid tank is disposed on the bottom wall and close to the rear wall. A clear water storage tank is disposed adjacently to the waste liquid tank and at the central portion of the bottom wall. A pure water generating unit is disposed on the bottom wall adjacently to the clear water storage tank and close to the front opening. A waste liquid filtering unit is disposed above the pure water generating unit. A pure water temperature adjusting unit is disposed above the waste liquid tank. A control unit and a console panel are disposed above the waste liquid filtering unit and the console panel is disposed on the front side of the housing.

1 Claim, 5 Drawing Sheets

PROCESSING WASTE LIQUID TREATING APPARATUS

BACKGROUND OF THE INVENTION

1. Field of the Invention

The present invention relates to a processing waste liquid treating apparatus attached to a processing device such as a cutting device for cutting a workpiece such as a semiconductor wafer or the like to treat processing waste liquid fed thereto during the processing.

2. Description of the Related Art

In the semiconductor device manufacturing step, the front surface of a generally disklike semiconductor wafer is sectioned into a plurality of areas by predetermined dividing lines called streets arranged in a lattice-like pattern. Devices such as ICs, LSIs or the like are formed on the areas thus sectioned. Thereafter, the semiconductor wafer is cut along the streets to divide the areas formed with the devices to manufacture the individual semiconductor devices. Also optical device wafer in which gallium nitride-based compound semiconductor or the like are laminated on the front surface of a sapphire substrate is cut along streets and divided into individual optical devices such as light-emitting diodes, laser diodes or the like, which are widely used in various electric equipment.

Cutting the semiconductor wafer or the optical device wafer described above along the streets is usually performed by a cutting device called a dicer. This cutting device includes a chuck table adapted to hold a workpiece such as a semiconductor wafer or the like; cutting means provided with a cutting blade for cutting the workpiece held by the chuck table; and processing water supply means for supplying processing water to the cutting blade. In addition, the processing water supply means supplies cutting water to the rotating cutting blade to cool it and supplies the processing water to a portion of the workpiece cut by the cutting blade. Thus, the cutting work is performed.

Cutting scraps produced by cutting silicon or gallium nitride-based compound semiconductor mix in the processing liquid supplied during the cutting as described above. Since the processing waste liquid immixed with the cutting scraps made of the semiconductor material pollutes environment, a waste liquid treating apparatus is used to remove the cutting scraps before reuse or discard. See e.g. Japanese Patent Laid-open No. 2004-230527.

The waste liquid treating apparatus includes a waste liquid storage tank for holding processing waste liquid; a pump for supplying the processing waste liquid held in the waste liquid storage tank; waste liquid filtering means for filtering the processing waste liquid supplied by the pump to purify it into clear water; and a clear water storage tank for holding the clear water purified by the waste liquid filtering means. The waste liquid treating apparatus further includes a clear water supply pump for supplying the clear water held in the clear water storage tank; control means for controlling the constituent means mentioned above; and a console panel equipped with display means for displaying the operating conditions of the constituent means controlled by the control means. A significantly large installation area is required to arrange the constituent means so that a clean room with high maintenance costs cannot be used effectively.

SUMMARY OF THE INVENTION

Accordingly, it is an object of the present invention to provide a processing waste liquid treating apparatus capable of being configured in an entirely compact manner.

In accordance with an aspect of the present invention, there is provided a processing waste liquid treating apparatus including: a waste liquid storage tank for holding processing waste liquid produced from processing liquid supplied to a processing device during processing; a waste liquid supply pump for supplying the processing waste liquid held in the waste liquid storage tank; waste liquid filtering means including a filter for filtering and purifying the processing waste liquid supplied by the waste liquid supply pump into clear water and a clear water receiving pan detachably supporting the filter; a clear water storage tank for holding the clear water purified by the waste liquid filtering means; a clear water supply pump for supplying the clear water held in the clear water storage tank; pure water generating means including ion exchange means for purifying the clear water supplied by the clear water supply pump into pure water and a support base for detachably supporting the ion exchange means; pure water temperature adjusting means for adjusting the pure water purified by the pure water generating means into a predetermined temperature; control means for controlling the above-mentioned constituent means; a console panel including input means for supplying processing information to the control means and display means for displaying an operative situation caused by the control means; and a housing for accommodating the above-mentioned constituent means.

Preferably, the housing includes a bottom wall, an upper wall, a left lateral wall, a right lateral wall, a rear wall and an opening/closing door for opening/closing a front opening; the waste liquid tank is disposed on the bottom wall and close to the rear wall, the clear water storage tank is disposed adjacently to the waste liquid tank and at the central portion of the bottom wall, and the pure water generating means is disposed on the bottom wall adjacently to the clear water storage tank and close to the front opening; the waste liquid filtering means is disposed above the pure water generating means; the pure water temperature adjusting means is disposed above the waste liquid tank; and the control means and the console panel are disposed above the waste liquid filtering means and the console panel is disposed on the front side of the housing.

In the processing waste liquid treating apparatus according to the present invention, the waste liquid tank is disposed on the bottom wall constituting part of the housing so as to be close to the rear wall. The clear water storage tank is disposed adjacently to the waste liquid tank and at the central portion of the bottom wall. The pure water generating means is disposed adjacently to the clear water storage tank and close to the front opening. The waste liquid filtering means is disposed above the pure water generating means. The pure water temperature adjusting means is disposed above the waste liquid tank. The control means and the console panel are disposed above the waste liquid filtering means and the console panel is disposed on the front side of the housing. Thus, the entire apparatus can compactly be configured without impairing operator's operability so that the clean room with high maintenance costs can effectively be utilized.

The above and other objects, features and advantages of the present invention and the manner of realizing them will become more apparent, and the invention itself will best be understood from a study of the following description and appended claims with reference to the attached drawings showing some preferred embodiments of the invention.

DETAILED DESCRIPTION OF THE PREFERRED EMBODIMENTS

Figure 1:
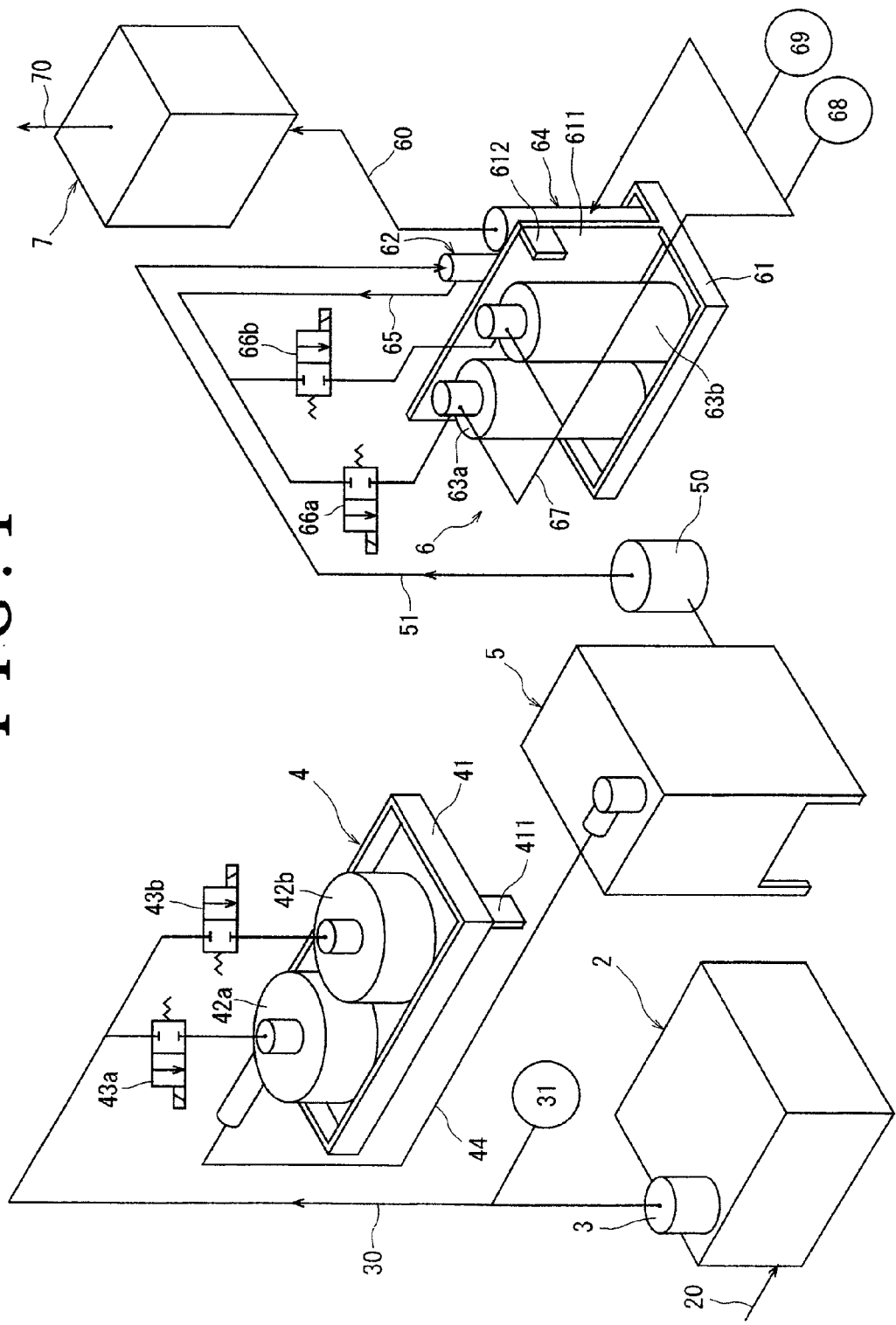
FIG. 1 is an explanatory view illustrating constituent elements of processing waste liquid treating apparatus configured according to the present invention in accordance with a flow of waste liquid.

Preferred embodiments of processing waste liquid treating apparatus configured according to the present embodiment will hereinafter be described in detail with reference to the accompanying drawings. FIG. 1 illustrates constituent elements of the processing waste liquid treating apparatus configured according to the present invention in accordance with the flow of processing waste liquid.

The processing waste liquid treating apparatus illustrated in an embodiment includes a waste liquid tank 2 for holding processing waste liquid; and a waste liquid supply pump 3 for supplying the processing waste liquid held in the waste liquid tank 2. The waste liquid tank 2 is connected via a supply pipe 20 to processing liquid supply means installed in a processing device such as a cutting device not shown. That is to say, the waste liquid tank 2 receives via the supply pipe 20 the processing waste liquid introduced from the processing waste liquid supply means installed in the processing device such as a cutting device not shown. The waste liquid supply pump 3 for supplying processing waste liquid is mounted on the upper wall of the waste liquid tank 2.

The processing waste liquid supplied by the waste liquid supply pump 3 is supplied to waste liquid filtering means 4 via a supply line 30 composed of a flexible hose. The waste liquid filtering means 4 includes a clear water receiving pan 41; and a first filter 42a and a second filter 42b disposed on the clear water receiving pan 41. The first filter 42a and the second filter 42b are detachably mounted on the clear water receiving pan 41. Electromagnetic on-off valves 43a, 43b are disposed on the pipe 30 connecting the waste liquid supply pump 3 with the first filter 42a and with the second filter 42b.

If the electromagnetic on-off valve 43a is energized or turned on to open, the processing waste liquid supplied by the waste liquid supply pump 3 is introduced into the first filter 42a. If the electromagnetic on-off valve 43b is energized or turned on to open, the processing waste liquid supplied by the waste liquid supply pump 3 is introduced into the second filter 42b. The processing waste liquid introduced into the first filter 42a is filtered by the first filter 42a and similarly the processing waste liquid introduced into the second filter 42b is filtered by the second filter 42b. Thus, the cutting scraps mixing in the processing waste liquid are caught by the first and second filters 42a, 42b so that the processing waste liquid is purified into clear water, which flows out in the clear water receiving pan 41. The clear water receiving pan 41 is connected to a clear water storage tank 5 via a supply line 44 composed of a flexible hose. Thus, the clear water flowing out on the clear water receiving pan 41 is supplied via the supply line 44 into the clear water storage tank 5 for storage.

Pressure detection means 31 is disposed on the pipe 30 so as to detect the pressure of the processing waste liquid supplied to the first and second filters 42a, 42b of the waste liquid filtering means 4. The pressure detection means 31 routes a detection signal to control means described later. For example, the electromagnetic on-off valve 43a may be energized or turned on and the processing waste is filtered by the first filter 42a. In such a state, if the detection signal from the pressure detection means 31 reaches a predetermined pressure value or more, the control means determines that processing scraps accumulate on the first filter 42a to lose the function of the filter. Then, the control means de-energizes or turns off the electromagnetic on-off valve 43a and energizes or turns on the electromagnetic on-off valve 43b. In addition, the control means displays on the display means mounted on the console panel described later the fact that the first filter 42a is switched to the second filer 42b.

Based on the message displayed on the display means as described above, an operator recognizes that the first filter 42a reaches the end of its usefulness, and then can replace the first filter. On the other hand, the electromagnetic on-off valve 43b may be energized or turned on and the processing waste may be filtered by the second filter 42b. In such a state, if the detection signal from the pressure detection means 31 reaches a predetermined pressure value or more, the control means determines that processing scraps accumulate on the second filter 42b to lose the function of the filter. Then, the control means de-energizes or turns off the electromagnetic on-off valve 43b and energizes or turns on the electromagnetic on-off valve 43a. In addition, the control means described later displays on the display means mounted on the console panel described later the fact that the second filter 42b is switched to the first filter 42a.

The clear water held in the clear water storage tank 5 supplied from the waste liquid filtering means 4 via the supply line 44 composed of a flexible hose is supplied by a clear water supply pump 50 to pure water generating means 6 via a pipe 51 composed of a flexible hose. The pure water generating means 6 of the illustrated embodiment includes a support base 61; a partition plate 611 provided on the supported base 61 to extend upward; and ultraviolet irradiation means 62 disposed on the rear side of the partition plate 611 of the support base 61. The pure water generating means 6 further includes first ion exchange means 63a and second ion exchange means 63b provided each with an ionic exchange resin and disposed on the front side of the partition plate 611 of the support base 61; and a fine filter 64 disposed on the rear side of the partition plate 611 of the support base 61.

The first and second ion exchange means 63a, 63b and the fine filter 64 are detachably arranged on the support base 61. The clear water supplied by the clear water supply pump 50 via a supply line 51 composed of a flexible hose is introduced into and irradiated with ultraviolet irradiation (UV) for sterilization. The clear water sterilized by the ultraviolet irradiation means 62 is introduced via a supply pipe 65 into first ion exchange means 63a or second ion exchange means 63b. Incidentally, an electromagnetic on-off valve 66a and an electromagnetic on-off valve 66b are disposed on the supply pipe 65. If the electromagnetic on-off valve 66a is energized or turned on to open, the sterilized clear water is introduced into the first ion exchange means 63a. If the electromagnetic on-off valve 66b is energized or turned off to open, the sterilized clear water is introduced into the second ion exchange means 63b.

The clear water introduced into the first ion exchange means 63a or the second ion exchange means 63b is subjected to ion exchange to be purified into pure water. Fine materials such as resin scraps of the ion exchange resin forming the first and second ion exchange means 63a, 63b may mix in the pure water resulting from the clear water subjected to ion exchange for purification as described above in some cases. Because of this, in the illustrated embodiment, the pure water resulting from the clear water subjected to ion exchange for purification by the first and second ion exchange means 63a, 63b is introduced into the fine filter 64 via a pipe 67. The fine filter 64 catches fine materials such as resin scraps of the ion exchange resin mixing in the pure water.

Pressure detection means 68 is provided on the supply pipe 67 so as to detect the pressure of the pure water supplied to the fine filter 64 from the first and second ion exchange means 63a, 63b. The pressure detection means 68 routes a detection signal to the control means. For example, if the detection signal of the pressure detection means 68 reaches a predetermined pressure value or more, the control means described later determines that fine materials such as resin scraps or the like accumulate on the fine filter 64 to lose the function of the filter, which is displayed on the console panel described later. Based on the message displayed on the display means as described above, the operator recognizes that the fine filter 64 reaches the end of its usefulness and then can replace the filter.

A resistivity meter 69 is disposed on the supply pipe 67 so as to detect the resistivity of the pure water supplied to the fine filter 64 from the first and second ion exchange means 63a, 63b. The resistivity meter 69 routes a detection signal to the control means. The electromagnetic on-off valve 66a may be energized or turned on and clear water may be purified by the first ion exchange means 63a into pure water. In such a state, if the detection signal of the resistivity meter 69 reaches a predetermined value (e.g. 10 MΩ·cm) or lower, the control means described later determines that the pure water purification capacity of the first ion exchange means 63a degrades. In addition, the electromagnetic on-off valve 66a is de-energized or turned off and the electromagnetic on-off valve 66b is energized or turned on. The control means described later displays on the display means provided on the console panel described later the fact that the first ion exchange means 63a is switched to the second ion exchange means 63b.

Based on the message displayed on the display means as described above, the operator recognizes that the first ion exchange means 63a reaches the end of its usefulness and then can replace the ion exchange resin of the first ion exchange means 63a. On the other hand, the electromagnetic on-off valve 66b may be energized or turned on and clear water may be purified by the second ion exchange means 63b into pure water. In such a state, if the detection signal of the resistivity meter 69 reaches a predetermined value (e.g. 10 MΩ·cm) or lower, the control means described later recognizes that the pure water purification capacity of the second ion exchange means 63b degrades. In addition, the electromagnetic on-off valve 66b is de-energized or turned off and the electromagnetic on-off valve 66a is energized or turned on. The control means described later displays on the display means provided on the console panel the fact that the second ion exchange means 63b is switched to the first ion exchange means 63a.

The pure water purified by the pure water generating means 6 is supplied to pure water temperature adjusting means 7 via a supply line 60 of a flexible hose. The pure water supplied to the pure water temperature adjusting means 7 is adjusted to a predetermined temperature (e.g. 23° C.). The pure water thus adjusted is circulated via a supply pipe 70 to processing liquid supply means equipped in a processing device such as a cutting device or the like not shown.

Figure 2:
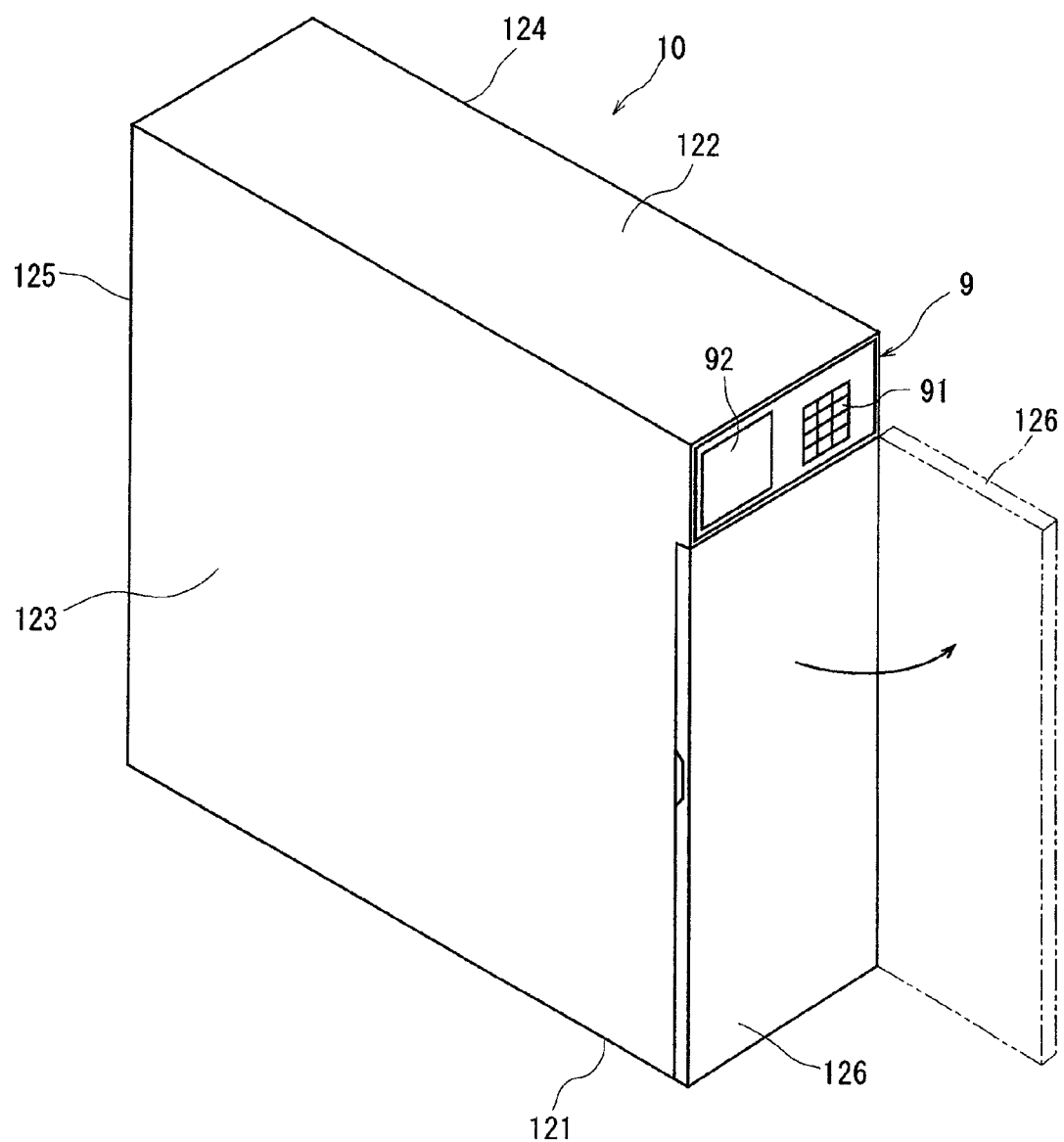
FIG. 2 is a perspective view of a housing in which the constituent elements of the waste liquid treating apparatus shown in FIG. 1 are arranged.
Figure 3:
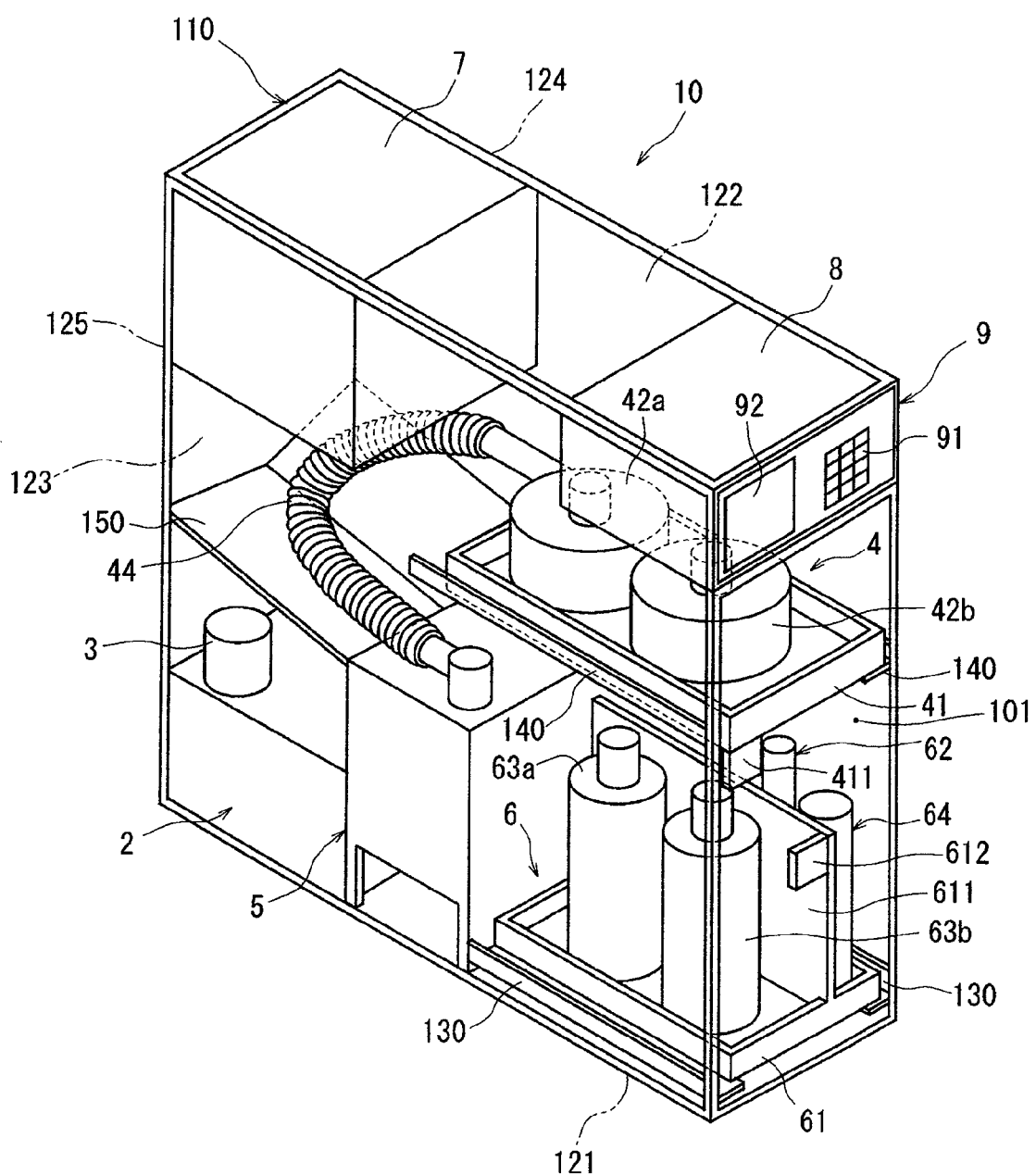
FIG. 3 is a perspective view illustrating the constituent elements of the processing waste liquid treating apparatus arranged in the housing while seeing through the walls constituting the housing shown in FIG. 2.

The waste liquid tank 2, the waste liquid filtering means 4, the clear water storage tank 5, the pure water generating means 6, the pure water temperature adjusting means 7 and the supply pipes and lines described above are arranged in an equipment housing 10 illustrated in FIGS. 2 and 3. FIG. 2 is a perspective view of the equipment housing 10. FIG. 3 illustrates the waste liquid filtering means 4, the clear water storage tank 5, the pure water generating means 6, the pure water temperature adjusting means 7 and the supply pipes and lines arranged in the equipment housing 10 by seeing through walls, described later, constituting the equipment housing 10. The equipment housing 10 of the illustrated embodiment includes a frame 110 forming a housing chamber shaped like a rectangular parallelepiped; a bottom wall 121 attached to the frame 110; an upper wall 122; a left lateral wall 123; a right lateral wall 124; a rear wall 125; and an opening/closing door 126 attached to the front of the frame 110 to open and close a front opening 101 formed on the front side of the frame 110.

The waste liquid tank 2, the clear water storage tank 5 and the pure water generating means 6 are arranged on the bottom wall 121 of the equipment housing 10 configured as described above. The waste liquid tank 2 is disposed close to the rear wall 125 and on the bottom wall 121 of the equipment housing 10. The clear water storage tank 5 is disposed adjacently to the waste liquid tank 2 and at the central portion of the bottom wall 121. The pure water generating means 6 is disposed adjacently to the clear water storage tank 5, close to the front opening 101 (close to the opening/closing door 126) and on the bottom wall 121.

Figure 4:
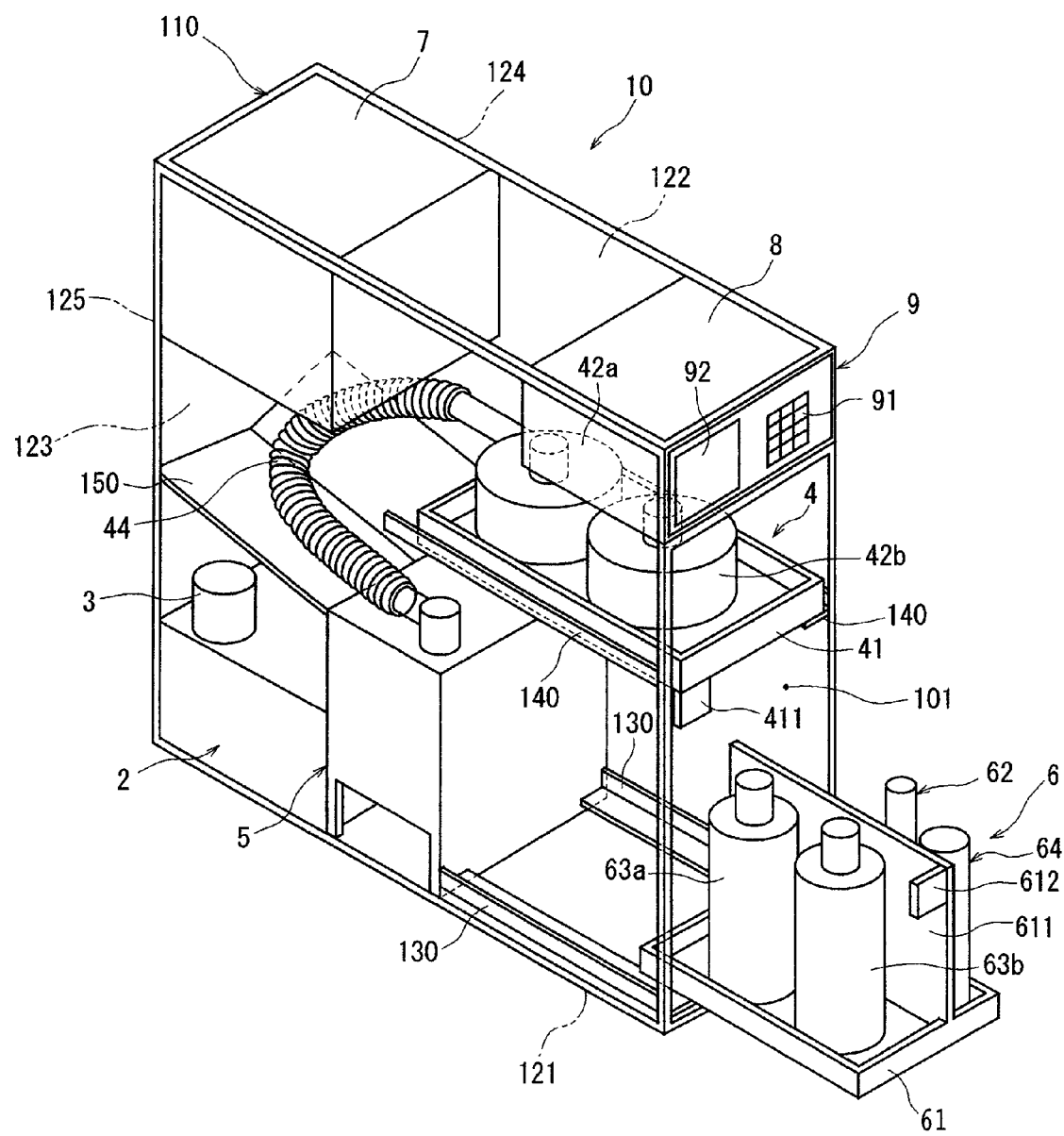
FIG. 4 is a perspective view illustrating a state where pure water generating means constituting part of the processing waste liquid treating apparatus shown in FIG. 3 is pulled out through a front opening of the housing.

The pure water generating means 6 is disposed so that it can be pulled out through the front opening 101 of the equipment housing 10 in the illustrated embodiment. More specifically, a pair of guide rails 130, 130 are arranged on the respective inner surface lower end portions of the left lateral wall 123 and right lateral wall 124 constituting the equipment housing 10 so as to be opposite to each other, and parallel to the upper surface of the bottom wall 121 and extend in the back and forth direction. Since the support base 61 of the pure water generating means 6 is placed on the pair of guide rails 130, 130, the pure water generating means 6 is supported so that it can be pulled out through the front opening 101 of the equipment housing 10 along the guide rails 130, 130. Accordingly, the first and second ion exchange means 63a, 63b and the fine filter 64 arranged on the support base 61 constituting part of the pure water generating means 6 can easily be replaced by pulling out the pure water generating means 6 through the front opening 101 of the equipment housing 10 along the guide rails 130, 130 as shown in FIG. 4.

In the processing waste liquid treating apparatus of the illustrated embodiment, the waste liquid filtering means 4 is disposed above the pure water generating means 6 and the clear water storage tank 5 in the equipment housing 10 so that it can be pulled out through the front opening 101 of the equipment housing 10. More specifically, a pair of guide rails 140, 140 are arranged on the respective inner surface intermediate portions of the left lateral wall 123 and right lateral wall 124 constituting part of the equipment housing 10 so as to be opposite to each other, and parallel to the upper surface of the bottom wall 121 (parallel to the pair of guide rails 130, 130) and extend in the back and forth direction. Since the clear water receiving pan 41 of the waste liquid filtering means 4 is placed on the pair of guide rails 140, 140, the waste liquid filtering means 4 can be supported so that it can be pulled out through the front opening 101 of the equipment housing 10 along the guide rails 140, 140.

Figure 5:
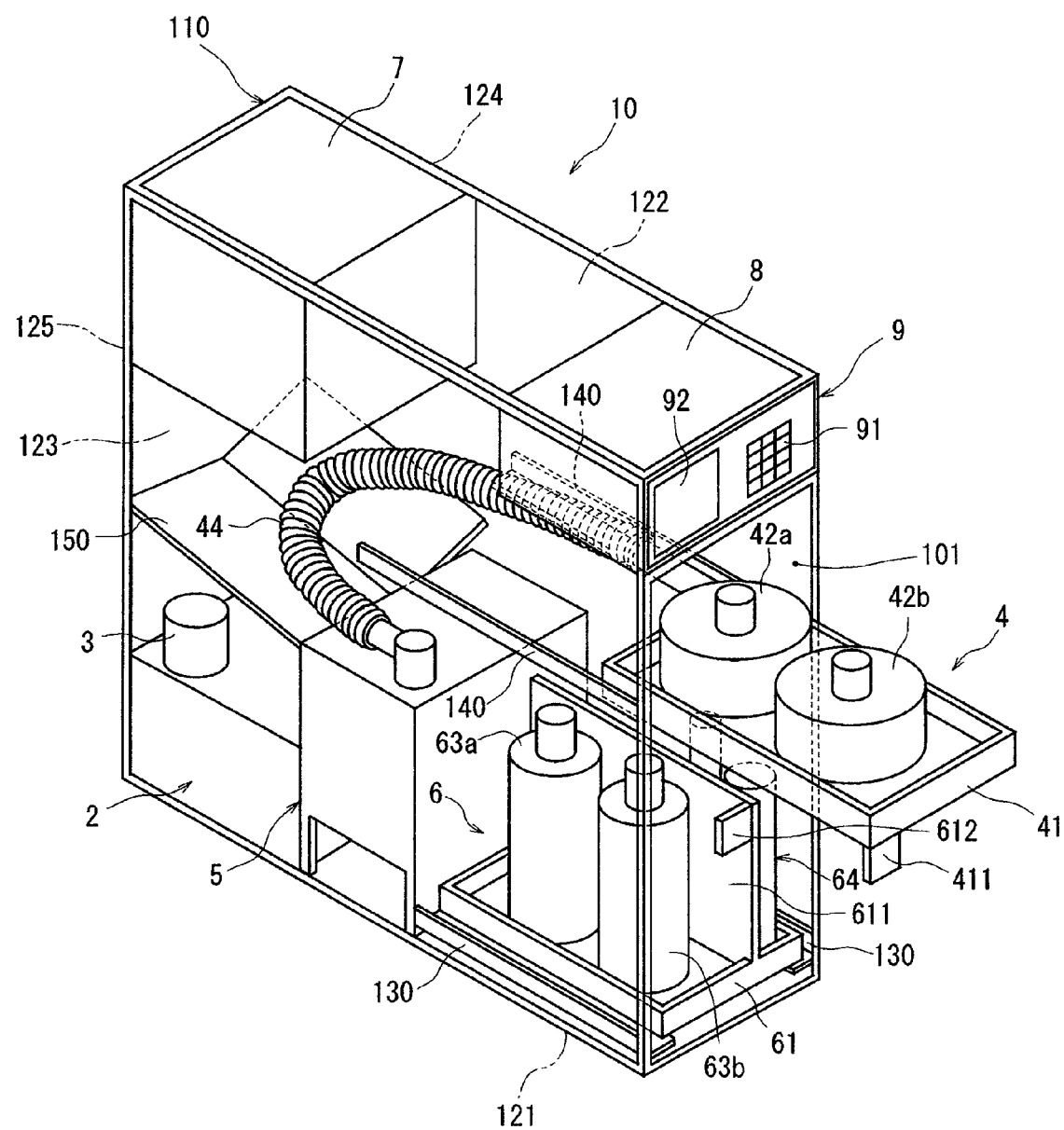
FIG. 5 is a perspective view illustrating a state where waste liquid filtering means constituting part of the processing waste liquid treating apparatus shown in FIG. 3 is pulled out through the front opening of the housing.

In addition, to facilitate the pulling-out operation of the waste liquid filtering means 4, a downward projecting grip 411 is provided at the front end of the clear water receiving pan 41 constituting part of the waste liquid filtering means 4. Thus, the first and second filtering means 42*a*, 42*b* detachably disposed on the clear water receiving pan 41 constituting part of the waste liquid filtering means 4 can easily be replaced by pulling out the waste liquid filtering means 4 through the front opening 101 of the equipment housing 10 along the pair of guide rails 140, 140 as shown in FIG. 5. Since the waste liquid filtering means 4 is disposed so that it can be pulled out, the supply line 44 connecting the clear water receiving pan 41 of the waste liquid filtering means 4 with the clear water storage means 5 is a flexible hose.

The clear water receiving pan 41 of the waste liquid filtering means 4 is connected to the clear water storage tank 5 through the supply line 44 composed of a flexible hose as described above. In relation to this, a hose support plate 150 is disposed on the side of the rear wall 125 of the equipment housing 10 with respect to the waste liquid filtering means 4 so as to support the supply line 44. This hose support plate 150 is inclinedly formed to be progressively elevated as it goes toward the rear wall 125 and also toward the right lateral wall 124. This can prevent the supply line 44 composed of a flexible hose from bending downward due to its own weight. In addition, this can constantly maintain a portion of the pipe 44 closer to the clear water receiving pan 41 at a higher position. Thus, clear water flowing out of the clear water receiving pan 41 can flow in the clear water storage tank 5 through the supply line 44 due to its own weight.

In the processing waste liquid treating apparatus of the illustrated embodiment, the pure water temperature adjusting means 7 is disposed above the hose support plate 150 in the equipment housing 10. Specifically, the pure water temperature adjusting means 7 is placed on a support member not shown mounted to the left lateral wall 123 and right lateral wall 124 constituting part of the equipment housing 10, and secured thereto with appropriate securing means.

The processing waste liquid treating apparatus includes the control means 8 for controlling the operation of the constituent means described above; and the console panel 9 adapted to supply the processing information such as waste liquid processing start information to the control means 8. The control means 8 and the console panel 9 are formed integrally with each other in the illustrated embodiment. The control means 8 and the console panel 9 configured as above are disposed above the waste liquid filtering means 4 in the equipment housing 10. Specifically, the control means 8 and the console panel 9 are placed on a support member not shown attached to the left lateral wall 123 and right lateral wall 124 constituting the equipment housing 10 and secured thereto with appropriate securing means. In this case, the console panel 9 is located on the front side of the equipment housing 10 (on the side where the opening/closing door 126 is disposed). In addition, input means 91 for supplying processing information, etc., displaying means 92 for displaying information processed by the control means 8 and the like are disposed on the console panel 9.

The processing waste liquid treating apparatus is configured as described above. If an operator supplies waste treatment start information from the console panel 9 to the control means 8, the control means 8 controls the constituent means described above to execute waste liquid treatment work. While executing the waste liquid treatment work mentioned above, the control means 8 displays on the display means 92 of the console panel 9 the following: The first filter 42*a* is switched to the second filer 42*b* when the electromagnetic on-off valve 43*a* of the waste liquid filtering means 4 is de-energized or turned off and the electromagnetic on-off valve 43*b* is energized or turned on; the second filter 42*b* is switched to the first filter 42*a* when the electromagnetic on-off vale 43*b* is de-energized or turned off and the first filter 42*a* is energized or turned on.

Based on the message displayed on the display means 92 as described above, the operator recognizes that the first or second filter 42*a* or 42*b* reaches the end of its usefulness. The operator opens the opening/closing door 126 of the equipment housing 10 and pulls out the waste liquid filtering means 4 through the front opening 101 of the equipment housing 10 along the pair of guide rails 140, 140. At this time, the operator pulls it out while gripping the grip 411 provided on the clear water receiving pan 41 constituting part of the waste liquid filtering means 4. In this way, the operator replaces the first or the second filer 42*a* or 42*b* in accordance with the message displayed on the displaying means 92.

During the execution of the waste liquid treatment work, when the detection signal from the pressure detection means 68 reaches the predetermined value or more, the control means 8 determines that the fine filter 64 loses its function and displays it on the display means 92 of the console panel 92. Based on the message displayed on the display means as mentioned above, the operator recognizes that the fine filter 64 reaches the end of its usefulness, opens the opening/closing door 126 of the equipment housing 10, and pulls out the pure water generating means 6 through the front opening 101 of the equipment housing 10 along the pair of guide rails 130, 130. In this case, the operator pulls it out while gripping the grip 612 provided on the partition plate 611 provided on the support base 61 to extend upright, the support base 61 constituting part of the pure water generating means 6. In this way, the operator replaces the fine filter 64 in accordance with the message displayed on the display means 92.

Further, during the execution of the waste liquid treatment work described above, when the detection signal from the resistivity 69 reaches the predetermined value (e.g. 10 MΩ·cm) or less, the control means 8 displays on the display means of 92 of the console panel 9 the following: The first ion exchange means 63*a* is switched to the second ion exchange means 63*b* when the electromagnetic on-off valve 66*a* of the pure water generating means 6 is de-energized or turned off and the electromagnetic on-off valve 66*b* is energized or turned on. In addition, the second ion exchange means 63*b* is switched to the first ion exchange means 63*a* when the electromagnetic valve 66*b* is de-energized or turned off and the electromagnetic valve 66*a* is energized or turned on.

Based on the message displayed on the display means 92, the operator recognized that the first or second ion exchange means 63*a* or 63*b* reaches the end of its usefulness, opens the opening/closing door 126 of the equipment housing 10, and pulls out the pure water generating means 6 through the front opening 101 of the equipment housing 10 along the pair of guide rails 130, 130. At this time, the operator pulls out the pure water generating means 6 while gripping the grip 612 provided on the partition plate 611 provided on the support base 61 to extend upright. The operator replaces the ion exchange resin of the first or second ion exchange means 63*a* or 63*b* in accordance with the message displayed on the display means 92.

The processing waste liquid treating apparatus is configured as described above. That is to say, the waste liquid tank 2, the clear water storage tank 5 and the pure water generating means 6 are arranged on the bottom wall 121 of the equipment housing 10. The waste liquid filtering means 4 is disposed above the pure water generating means 6. The pure water temperature adjusting means 7 is disposed above the hose support plate 150 (above the waste liquid tank 2). The control means 8 and the console panel 9 are arranged in vicinity to the pure water temperature adjusting means 7. Thus, the entire equipment can compactly configured without impairing the operator's operability so that a clean room with high maintenance costs can effectively be utilized. The pure water generating means 6 is disposed close to the front opening 101 of the equipment housing 10 and configured so that it can be pulled out through the front opening 101. Therefore, the first and second ion exchange means 63*a*, 63*b* and the fine filter 64 can easily be replaced. Further, since also the waste liquid filtering means 4 is configured so that it can be pulled out through the front opening 101 of the equipment housing 10, the first and second filters 42*a*, 42*b* can easily be replaced.

The present invention is not limited to the details of the above described preferred embodiments. The scope of the invention is defined by the appended claims and all changes and modifications as fall within the equivalence of the scope of the claims are therefore to be embraced by the invention.

What is claimed is:

1. A processing waste liquid treating apparatus comprising:
    a waste liquid storage tank for holding processing waste liquid produced from processing liquid supplied to a processing device during processing;
    a waste liquid supply pump for supplying the processing waste liquid held in the waste liquid storage tank;
    waste liquid filtering means including a filter for filtering and purifying the processing waste liquid supplied by the waste liquid supply pump into clear water and a clear water receiving pan for receiving the clear water detachably supporting the filter;
    a clear water storage tank for holding the clear water purified by the waste liquid filtering means;
    a clear water supply pump for supplying the clear water held in the clear water storage tank;
    pure water generating means including ion exchange means for purifying the clear water supplied by the clear water supply pump into pure water and a support base for detachably supporting the ion exchange means;
    pure water temperature adjusting means for adjusting the pure water purified by the pure water generating means into a predetermined temperature;
    control means for controlling the waste liquid storage tank, the waste liquid supply pump, the waste liquid filtering means, the clear water storage tank, the clear water supply pump, the pure water generating means, and the pure water temperature adjusting means;
    a console panel including input means for supplying processing information to the control means and display means for displaying an operative situation caused by the control means; and
    a housing for accommodating the waste liquid storage tank, the waste liquid supply pump, the waste liquid filtering means, the clear water storage tank, the clear water supply pump, the pure water generating means, and the pure water temperature adjusting means,
    wherein:
    the housing includes a bottom wall, an upper wall, a left lateral wall, a right lateral wall, a rear wall and an opening/closing door for opening/closing a front opening;
    the waste liquid tank is disposed on the bottom wall and close to the rear wall, the clear water storage tank is disposed adjacently to the waste liquid tank and at the central portion of the bottom wall, and the pure water generating means is disposed on the bottom wall adjacently to the clear water storage tank and close to the front opening;
    the waste liquid filtering means is disposed above the pure water generating means;
    the pure water temperature adjusting means is disposed above the waste liquid tank; and
    the control means and the console panel are disposed above the waste liquid filtering means and the console panel is disposed on the front side of the housing.

\* \* \* \* \*